Sept. 3, 1957  J. J. KOZAR  2,804,711
LINE HOLDER FOR POLE WITH SPINNING REEL ATTACHED THERETO
Filed March 2, 1955
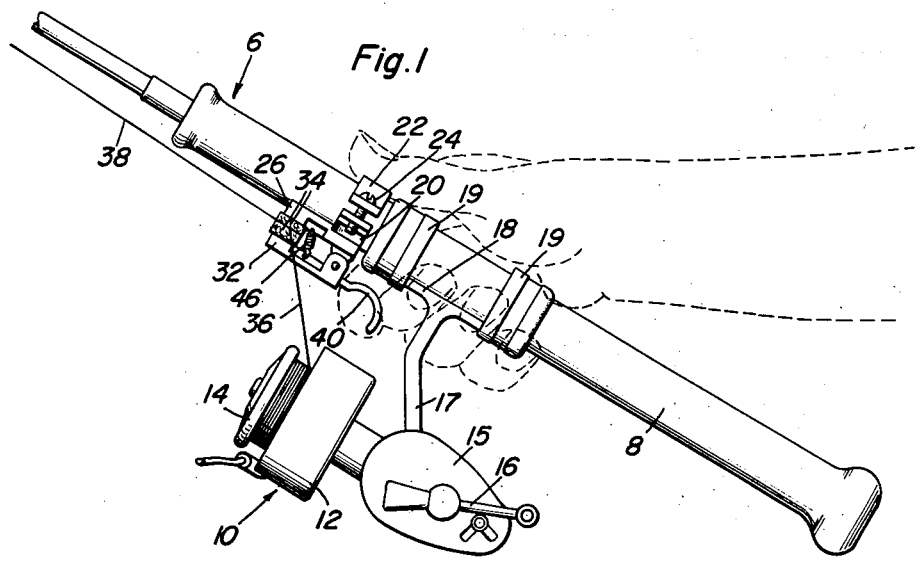
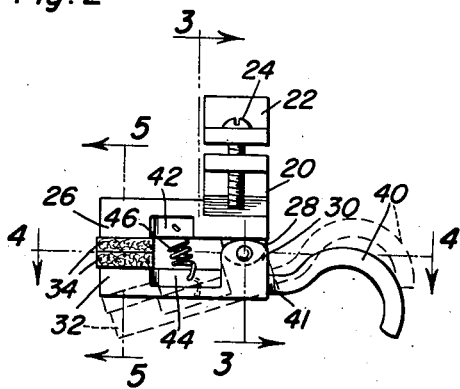
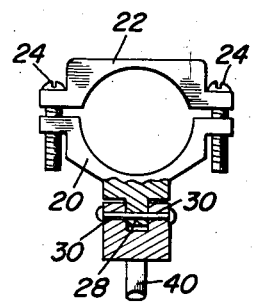
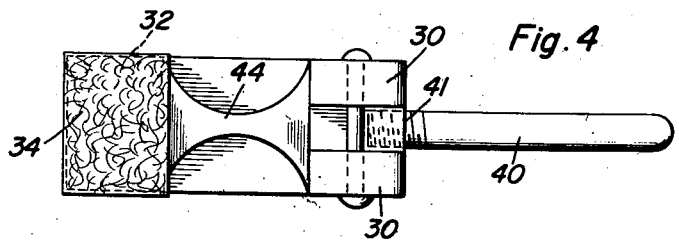
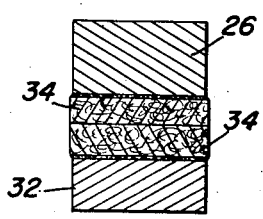
John J. Kozar
INVENTOR.

United States Patent Office 2,804,711
Patented Sept. 3, 1957

2,804,711

LINE HOLDER FOR POLE WITH SPINNING REEL ATTACHED THERETO

John J. Kozar, Arnold, Pa.

Application March 2, 1955, Serial No. 491,700

1 Claim. (Cl. 43—25)

The present invention relates to an improved and apparently new combination which has to do with a fishing pole or rod, of any suitable or desirable type, a spinning reel which is operatively mounted on the customary handle forming end of said pole, and a complemental line holder which is also mounted on the pole between and in advance of the line carrying spool of said spinning reel.

Set forth with greater particularity, the subject matter of invention herein under advisement and to be comprehensively revealed has to do with a fishing line pole having customary handle means at one end, a spinning reel having operating and bracketing means, the latter affixed to said handle means so that the axis of rotation of the reel is spaced from but parallel to the longitudinal axis of said pole, a mechanical line holder independent of said reel, said holder being manually releasable and also mounted on said pole between the latter and reel and positioned in close proximity to the latter but slightly in front thereof.

Then, too, novelty is predicated on a line holder which is characterized by a pole embracing clamp, the latter being detachably and adjustably mounted on the pole and carrying a pair of opposed hingedly connected spring closed line grips, the grips having jaws whose line contacting surfaces are preferably covered with felt or the like to minimize chafing and undue wearing of the customary nylon lines.

It is a matter of common knowledge that normally the handle means on the pole is grasped in the hand with the thumb resting atop the handle and the fingers wrapped around the handle and straddling the attaching bracket for the spinning reel. This puts the index finger of the hand in a position in advance of the position of the reel, and the finger is used as the means for holding and controlling the line. What with the present invention, the mechanical manually operated line holder is substituted for the index finger. Therefore, in carrying out the principles of the invention, a hook-like finger piece or trigger is provided, and this is located where it will be in a handy position to enable the fisherman to open and close the jaws at the exact moment the line is to be released, that is, when a cast is being made.

Other objects, features and advantages will become more readily apparent from the following description and the accompanying sheet of illustrative drawings.

In the drawings:

Figure 1 is a view in side elevation and somewhat in perspective showing the improved combination and the manner in which the fisherman grasps the handle and also controls the line holder;

Figure 2 is a side elevation of the line holder by itself and illustrating the relatively movable or hinge jaw swung to open position in phantom lines;

Figure 3 is a section on the irregular vertical line 3—3 of Figure 2, looking in the direction of the arrows;

Figure 4 is an exaggerated horizontal section on the line 4—4 of Figure 2, looking in the direction of the arrows; and Figure 5 is also an exaggerated cross-section on the vertical line 5—5 of Figure 2, also looking in the direction of the arrows.

Referring now to Figure 1, the pole is denoted generally by the numeral 6 and has an appropriate handle or hand grip 8 at one end thereof. It may be stated in this connection that the present invention may obviously be one which involves bamboo, aluminum, steel or glass or equivalent poles and rods. Insofar as the essence of the invention is concerned, any "pole" or "rod" with a handle thereon will do.

The spinning reel is denoted generally by the numeral 10 and it includes, among other parts, a cup-like shell or case 12, a line-equipped projectible and retractible spool 14, a gear case with operating means therein, as generally denoted at 15, and an operating handle 16. The bracketing or attaching means comprises a T-shaped member having a stem or shank 17 and a crosshead 18 paralleling the handle and connected thereto by collars or equivalent attaching members 19—19. Thus, the spinning reel may be said to be a conventional type and customarily mounted with the axis of rotation parallel to and spaced from the lengthwise axis of the pole or rod. The line holder is a relatively simple and practical mechanical device, and comprises a sectional clamp, one part or section 20 of which partly embraces the rod, and the other part 22 embraces the remainder of the pole or rod, the two sections being secured together by screws or similar fastenings 24. The clamp, as before stated, has jaw members thereon, and one member is fixed to the clamp section 20 and extends at right angles therefrom and terminates in a so-called relatively stationary jaw 26. At one end, this has a lateral lug 28 fitting between a pair of spaced parallel ear-like lugs 30 on the corresponding end of the relatively movable jaw member. This has at its free end a jaw 32 which is opposed and movable toward and from the jaw 26, and both jaws are faced with felt or the like 34 to effectually handle the fishing line. In Figure 1, the fishing line has a portion thereof held between the felt-equipped jaws. This portion exists between the part 36 which comes off of the spool and the part 38 which passes along the rod through the customary guide eyes (not shown). With the jaws closed against the line, the line does not unwind off the reel until released intentionally by the fisherman. It follows that the clamp is detachably and adjustably mounted on the handle 8 in advance of the bracket means and also slightly in advance of the reel or spool 14. That is to say, the holder occupies the position which is normally occupied by the index finger of the fisherman's hand. A manually trippable finger piece is provided, and this is preferably hook-shaped, as at 40, and it has a screw threaded shank 41 which threads into a socket provided therefor in the jaw member, all as shown in Figure 4. The two jaw members are provided with central notched portions having webs 42 and 44 which serve to accommodate the coil spring. The coil spring 46, as shown in Figure 2, has one end fastened to the web 42 and the other end to the web 44.

This type of a line holder, inasmuch as it has a simple clamp, may be shifted lengthwise, rotated around the circumference of the rod and readily applied and removed. It may be completely detached and used on any other type of a pole or rod in conjunction, of course, with a spinning reel. It follows that the fisherman may purchase the line holder separately at a nominal cost and attach it to his pole, and he is ready to fish.

As is reasonably well evident from the description and drawings, the invention has to do with the combination shown in Figure 1 and also the subcombination, that is, the line holder, per se, as shown in Figure 2, and the claim is accordingly presented.

What is claimed as new is as follows:

A fishing pole attachment comprising a line holder adapted for use on a pole having a spinning reel attached thereto and characterized by a two-part clamp wherein the parts are opposed and shaped to embrace the pole, screw-type fastenings securing said parts in assembled relationship, a relatively stationary jaw member carried by and projecting laterally from a central portion of one part of the clamp and terminating in a jaw, an opposed relatively movable jaw member, the ends of said jaw members which correspond being hingedly connected together, the ends of the jaw members opposite to the hinge connection being free and movable toward and from each other, the intermediate portions of said jaw members having opposed webs, a coil spring interposed between and having its ends respectively connected to said webs, the jaw portions of said members being equipped with felt line-gripping surfaces, and a hook-shaped finger-piece connected to the hinged end portion of said movable jaw member for actuating the same.

References Cited in the file of this patent

UNITED STATES PATENTS

| | | |
|---|---|---|
| 1,709,436 | Koester | Apr. 16, 1929 |
| 2,183,445 | Conterman | Dec. 12, 1939 |
| 2,301,243 | Binkley | Nov. 10, 1942 |
| 2,648,505 | Mauborgne | Aug. 11, 1953 |